United States Patent [19]
Patrick et al.

[11] Patent Number: 5,734,858
[45] Date of Patent: Mar. 31, 1998

[54] METHOD AND APPARATUS FOR SIMULATING BANKED MEMORY AS A LINEAR ADDRESS SPACE

[75] Inventors: Stuart R. Patrick, Issaquah; Richard A. Pletcher, Redmond; Michael S. Gibson, Redmond; Amit Chatterjee, Redmond, all of Wash.

[73] Assignee: Microsoft Corporation, Redmond, Wash.

[21] Appl. No.: 327,971

[22] Filed: Oct. 24, 1994

[51] Int. Cl.[6] .............................. G06F 9/26; G06F 12/02; G06F 12/04; G06F 12/10
[52] U.S. Cl. ..................... 395/412; 395/402; 395/405; 395/404; 395/415; 395/412; 395/416; 395/417; 395/418
[58] Field of Search .......................... 395/405, 427, 395/402, 404, 401, 412, 415, 416, 417, 418

[56] References Cited

U.S. PATENT DOCUMENTS

| | | | |
|---|---|---|---|
| 4,926,322 | 5/1990 | Stimac et al. | 395/500 |
| 5,249,280 | 9/1993 | Nash et al. | 395/405 |
| 5,255,382 | 10/1993 | Pawloski | 395/402 |
| 5,321,425 | 6/1994 | Chia et al. | 345/200 |

OTHER PUBLICATIONS

Statement Describing a Conventional System.

*Primary Examiner*—Robert W. Downs
*Assistant Examiner*—Than V. Nguyen
*Attorney, Agent, or Firm*—Seed and Berry LLP

[57] ABSTRACT

A method and apparatus for providing access to a banked peripheral memory via a contiguous linear address space. The present invention provides a linear address space having a present region that is mapped to a host memory region of a computer system. The present invention further provides a relocatable selector that provides access to a portion of the linear address space. Accessing programs exchange data with the banked peripheral memory via the relocatable linear address space. When an accessing program references an address of the relocatable address base that is not mapped to the present region, the relocatable linear address space is positioned so that the referenced address maps to the present region. Additionally, a bank of the peripheral memory that corresponds to the referenced address is also mapped into the host memory region so as to enable the accessing program to exchange data with the banked peripheral memory via the relocatable linear address space.

32 Claims, 10 Drawing Sheets

METHOD AND APPARATUS FOR SIMULATING BANKED MEMORY AS A LINEAR ADDRESS SPACE

TECHNICAL FIELD

The present invention relates to the field of computer system memories, and more particularly, the field of simulating a banked memory as a linear address space.

BACKGROUND OF THE INVENTION

Software programs are executed in a main memory area of a computer system. As defined herein, the term "main memory" refers to memory that is directly addressable by a central processing unit. In general, as a software program grows more complex, it requires more memory to process and display its associated data. However, as the amount of main memory available in a computer system is finite, various methods have been developed that allow data to be stored in a peripheral memory when not immediately needed by the software. Common examples of such peripheral memory include expanded memory, the addressable video memory contained on a video adapter card, and computer disks. When the software program needs to access data that is stored in the peripheral memory, the needed data is made accessible via a host memory region. As defined herein, the phrase "host memory region" refers to a region of the computer system's main memory. Typically only portions of the peripheral memory are made accessible to software programs via the host memory region. These portions are generally referred to as "banks." In brief, a bank is a peripheral memory section that is formed by a number of consecutive physical memory locations.

FIG. 1 illustrates a conventional computer system having a banked peripheral memory. More specifically, the computer 100 contains a user input device 110, a main memory area 120, a video adapter card 130, and a video display 140. The main memory area contains an application program 122, a video driver 124, and a host memory region 129. Also, contained on the video card is a banked peripheral memory 132 that is formed by a number of banks 134. As will be explained in more detail below, the video driver interacts with the video adapter card in order to ensure that the video display is updated in accordance with requests of the application program. In brief, the video driver relays the application program's peripheral memory requests to the video adapter card. In turn, the video adapter card continuously updates the video display based on the data contained within the banked peripheral memory. More specifically, the video driver receives, from the application program, a number of addresses that represent peripheral memory locations that the application program desires to access (e.g., memory locations that the application program wishes to read or to write data in). The device driver then, based upon the addresses of the desired peripheral memory locations, determines the peripheral memory bank that is needed to satisfy the application program's request. The video driver then maps the needed bank into the host memory region by issuing a command to the video adapter card. The process of mapping a desired bank into the host memory region is known as bank switching. In brief, the video driver conducts bank switching by loading a predefined register with an identifier of the desired bank and outputting the loaded register to a processor (not shown) contained on the video adapter card. An example of such a processor is the 82c453 processor manufactured by Chips and Technologies, Inc. Generally, the bank identifier that is forwarded to this processor is a numerical identifier which, by convention, has a value between 0 and n (where n is the total number of banks that form the peripheral memory). After the driver has loaded and outputted the register, the video card's processor contained maps the desired bank into the host memory region. Once the desired bank is in the host memory region, the video driver either reads or writes to the data as requested by the application program. The video card, by continuously updating the video display using the data contained within the banked peripheral memory, ensures that the display illustrates the changes made by the video driver.

Although the above-described method allows the video driver to access any memory location of the peripheral memory, the method has distinct drawbacks. One drawback is that the video driver is required to determine each time that the application program's memory access request crosses a bank boundary. When the request does cross a bank boundary, the driver must selectively transfer the data to/from the banks that define the bank boundary. More specifically, for each bank boundary-crossing memory access request the driver must: (1) map a first bank into the host memory region, (2) update the data of the first bank via the host memory region; (3) map a second bank into the host memory region; and (4) update the data of the second bank via the host memory region. By requiring the video driver to continuously check for bank boundaries and conduct bank switching, the resulting driver code is fairly complex and relatively slow. Moreover, because the driver code is so closely coupled to both the particular peripheral device (e.g., the format of the bank switching register) and the hardware constraints of the computer system (e.g., the size of the host memory region), the device driver is not easily portable between differing computer systems.

SUMMARY OF THE INVENTION

The present invention is directed towards having a host memory region that provides access to a banked peripheral memory. More specifically, by simulating the banked peripheral memory as a linear address space, the facility enables software programs to quickly and easily access all memory locations of the peripheral memory. In a preferred embodiment of the present invention, the facility reserves a linear address space that is approximately twice the size of the banked peripheral memory. This linear address space is formed by a plurality of pages that are accessible via a page table and a page table cache. The facility also furnishes a selector having an adjustable base address and a size that is preferably equal to that of the banked peripheral memory. A present region, defined by a predefined number of the linear address space's pages, is mapped to the host memory region. Ideally, this predefined number of pages is the number of pages necessary to provide access to the entire host memory region when the pages are sequentially mapped to the host memory region. The selector is mapped so that it is contained within the reserved linear address space. In this manner, the selector provides access to a portion of the linear address space. Once the linear address space and the selector have been provided, the facility allows software programs to access the entire range of the banked peripheral memory by referencing addresses of the selector. When the referenced addresses are mapped to the present region, the facility provides immediate access to the desired peripheral memory locations. When the referenced addresses are not mapped to the present portion, the facility determines a bank of the peripheral memory that corresponds to the referenced addresses and maps that bank into the host memory region.

The facility also modifies the position of the selector so that the referenced addresses map to the host memory region. In this fashion, the facility allows software programs to access the peripheral memory without testing for end of bank conditions or conducting any bank switching. As a result, the device drivers' and application programs' code is simpler than that which exists in conventional systems. Due to this resulting simplicity, the code is extremely efficient and highly portable. Moreover, as the facility slides the selector around in the linear address space, while maintaining a static present region in the linear address space, the facility does not require any page table modifications or page table cache flushing. By providing a system that neither requires page table or page cache modification, the time required to access the peripheral memory is minimized.

DETAILED DESCRIPTION OF THE INVENTION

The present invention is directed towards computer systems having a banked peripheral memory that is normally accessible only through a host memory region. More specifically, the present invention provides a facility that simulates the banked peripheral memory as a linear address space. This simulation allows accessing modules (e.g., device driver programs and application programs) to treat the banked peripheral memory as if it were a single contiguous linear memory buffer. By treating the banked peripheral memory as a contiguous linear buffer, the accessing module's code is greatly simplified relative to that which exists in conventional systems. More specifically, the present invention eliminates the need for an accessing module to conduct any bank switching or to even be aware that the limited host memory region exists. As a direct result, the accessing module's execution speed is minimized. Moreover, as the accessing module is no longer required to be closely tied to the hardware restraints of the computer system, the module is highly portable.

Figure 1:
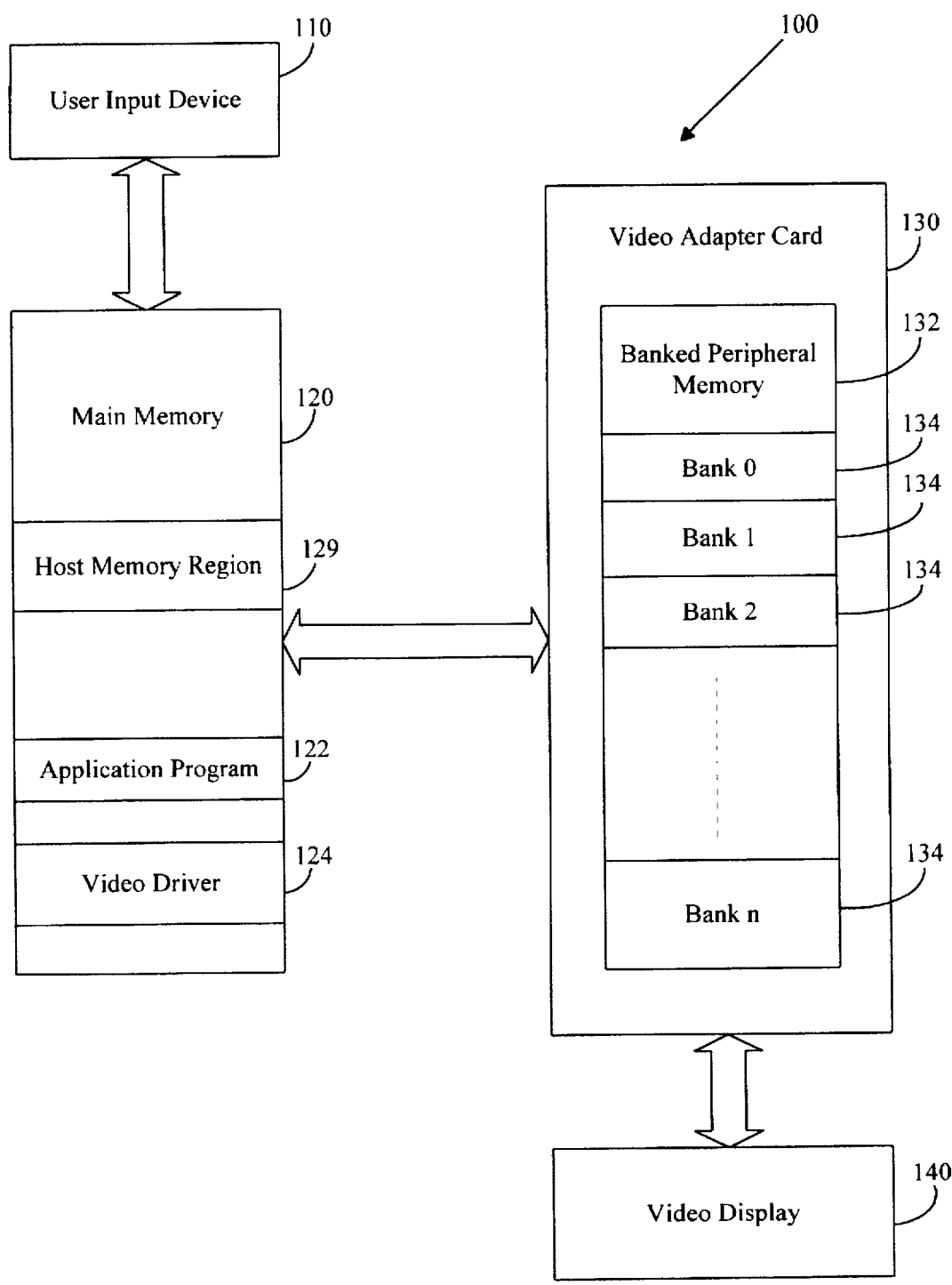
FIG. 1 illustrates a conventional computer system (prior art).
Figure 2:
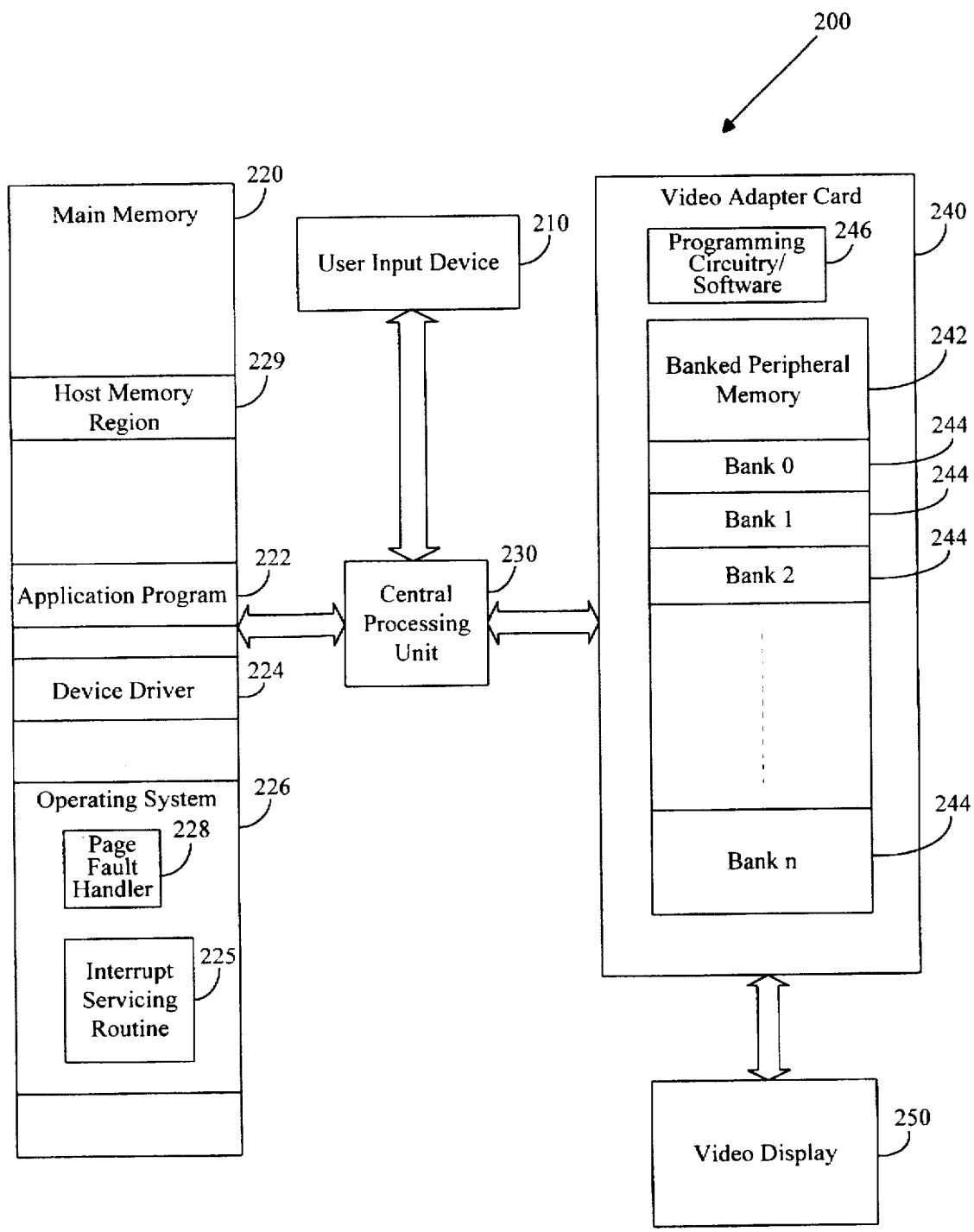
FIG. 2 illustrates a computer system practicing the present invention.

FIG. 2 illustrates a computer system practicing the present invention. The computer system 200 contains a user input device 210, a main memory 220, a central processing unit 230, a video adapter card 240, and a video display 250. These components are interconnected as shown. The main memory 220 contains an application program 222, a device driver 224, a host memory region 229, and an operating system 226 that contains an operating system page fault handler 228, and a page fault exception servicing routine 225. The video adapter card 240 contains a banked peripheral memory 242 that is formed by a number of physical memory banks 244. Additionally, the video adapter card contains programming circuitry and associated software 246 (e.g., a VGA processor) that allows a desired bank or banks to be programmed into the host memory region.

As mentioned above, the present invention allocates a linear address space and a sliding selector to simulate the banked peripheral memory 242 as a linear address space. The details of the operations of preferred embodiments will be explained in detail below with reference to FIGS. 5–10. However, prior to launching into the details of the present invention an introductory discussion of virtual addressing is provided.

In computer systems, there is an almost limitless need for main memory 220. This need arises because a variety of software programs compete for a finite amount of main memory. In response to this need, a process known as memory virtualization has been developed. In brief, virtualization allows software programs to see the computer system as providing a larger amount of memory than is actually available to the software program at any one time. Virtualization is accomplished by allowing software programs to reference memory addresses that do not directly correlate to the physical memory addresses that form the main memory. The memory locations that software programs address are known as virtual addresses. Collectively, a grouping of virtual addresses is known as a virtual address space. Similarly, a grouping of physical memory addresses form a physical address space. When a software program attempts to access a virtual memory address, the computer system translates the virtual memory address into a physical memory address. Typically, this translation process is accomplished through a memory management hardware component of the central processing unit 230 and software that interacts with the memory management hardware component. In the 80386 microprocessor and its successors (e.g., the 80486 microprocessor) that are produced by Intel Corp., this memory management hardware component is formed by a segmentation mechanism and a paging mechanism. The translation of virtual addresses to physical addresses will now be described with reference to this segmentation and paging mechanisms that exist in the microprocessors.

In brief, this segmentation process provides for the reserving of a number of virtual address spaces. These virtual address spaces initially exist as segmented address spaces. Each segmented address space is defined using a segment base address and a segment limit. The segmented address space is then translated into a second virtual address space known as a linear address space. A segmented address space is referenced by specifying the segment's base address and an offset that is used as an index into the segment. This offset is then combined with the segment's base address to produce a linear address. Collectively, a number of linear addresses form the linear address space.

Figure 3:
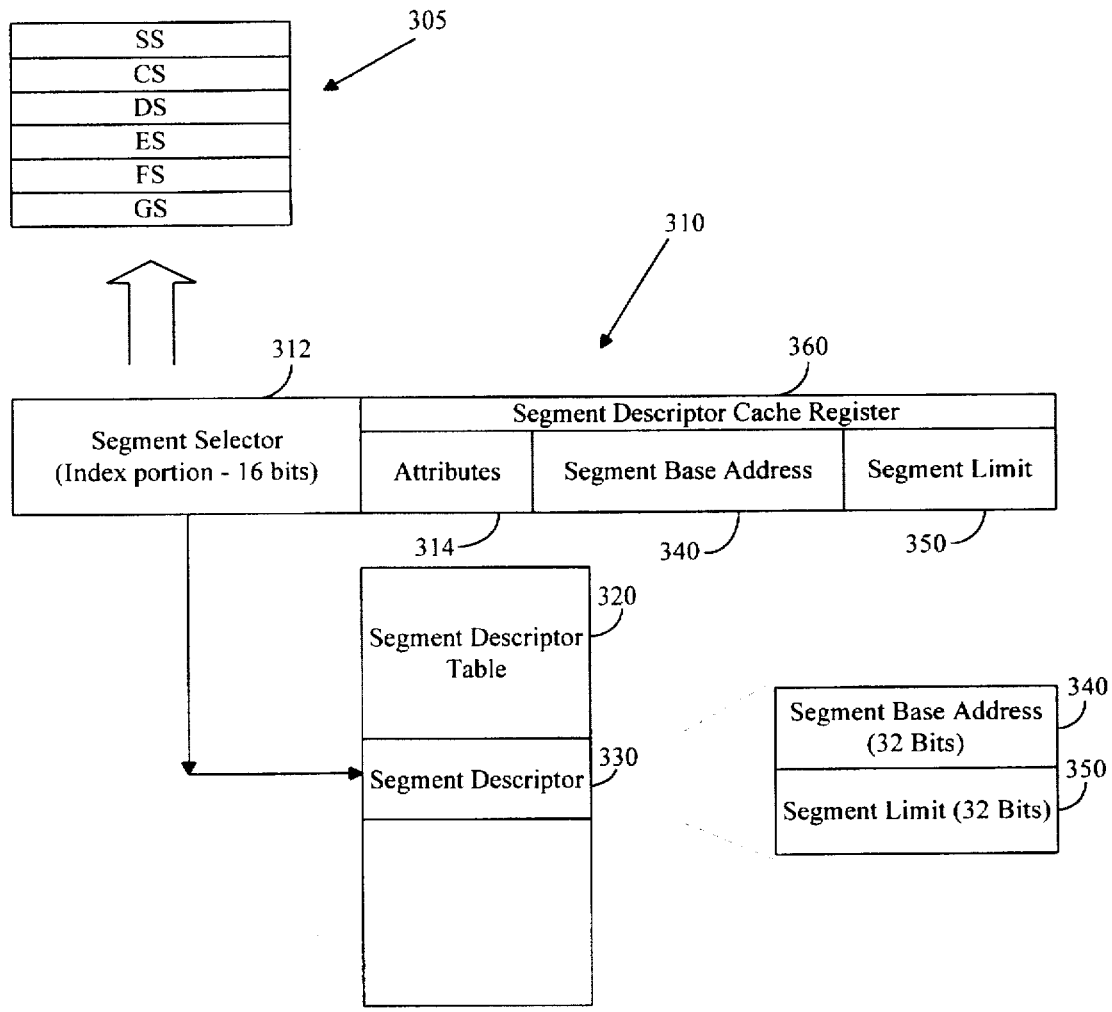
FIG. 3 illustrates a segmentation process for reserving linear address spaces (prior art).

FIG. 3 illustrates the segmentation process in greater detail. The previously mentioned Intel microprocessors provide a number of segment registers 305 (e.g., DS, ES, FS, GS, CS, and SS) that are loaded with a segment selector 310. The segment selector is composed of an index portion 312 and an attributes portion 314. The attributes portion dictates a privilege level of the associated segment while the index portion serves as an index into a segment descriptor table 320. In brief, by varying the privilege level, the entity responsible for allocating the segment can control what software programs are permitted to access the segment. The index portion serves as an index into a structure known as a segment descriptor table 320. The segment descriptor table is created and maintained in the main memory 220 and is formed by a number of segment descriptors 330. Each segment descriptor defines a linear address space via a base address 340 and a segment limit 350. The base address defines the starting address of the linear address space while the segment limit defines size of the linear address space. Whenever a segment register is loaded with a segment selector, the microprocessor, by using the segment selector as an index into the segment descriptor table, retrieves a corresponding segment descriptor for the selector. Subsequently, the microprocessor stores the base address and segment limit in a segment descriptor cache register 360. The segment descriptor cache register is a portion of memory that is contained within the microprocessor itself and which is not available to any software program that exists in the main memory. The purpose of this segment descriptor cache register is to avoid the relatively slow segment descriptor table look up process.

When a software program desires to access a particular address contained within a segment, the software program loads a segment register with the desired segment selector and specifies an offset into the segment. For example, after loading segment register DS with the desired segment selector, the tenth address of the corresponding segment is specified by identifying the selector and the offset (i.e., DS:09x, where "09x" indicates the hexadecimal representation of the number 9). The microprocessor then converts this selector:offset representation of the address into a linear address by adding the offset to the base address of the segment.

Figure 4:
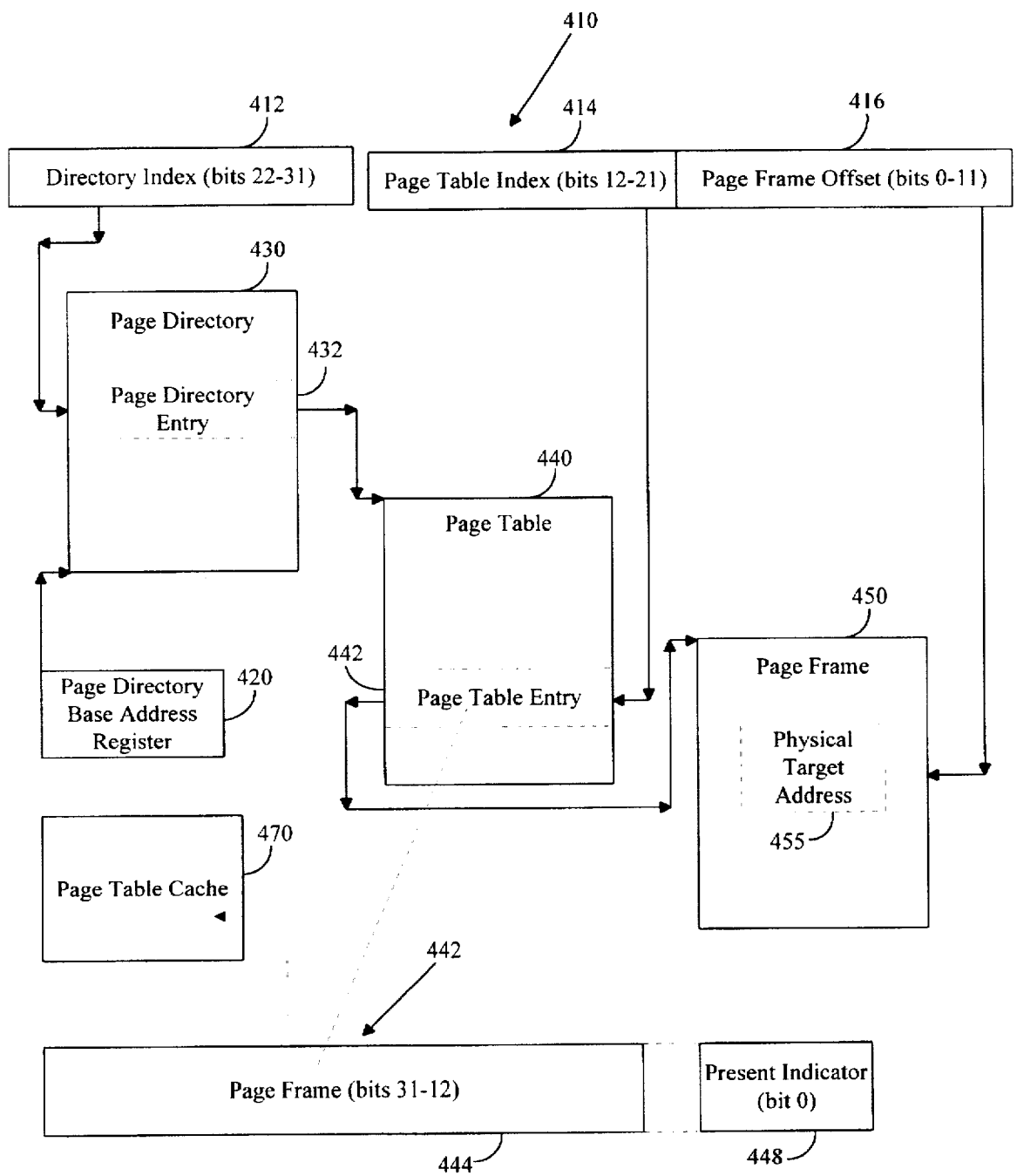
FIG. 4 illustrates a paging mechanism that translates linear addresses into physical addresses (prior art).

The above-mentioned Intel microprocessors include a paging mechanism that translates linear addresses into physical addresses. In brief, the paging mechanism resolves pages of a linear address space into pages of a physical address space. A page is a fixed-sized block of memory that is formed by a number of consecutive addresses. A virtual page is a page contained within a virtual address space. Analogously, a physical page is a page contained within a physical address space. FIG. 4 illustrates the functionality of the paging mechanism in detail. The paging mechanism resolves a linear address into a physical address via a two-tier table look up process. More specifically, the linear address 410 is broken into three constituent parts: a directory index 412, a page table index 414, and a page frame offset 416. As will be explained in more detail below, the directory index points to an entry of a page directory table 430, the page table index points to an entry of a page table 440, and the page frame offset points to an address of a page 450.

The translation of a linear address to a physical address begins by specifying a page directory base address in a page directory base address register 420. The address stored in the page directory base address register identifies the location of the page directory table 430. The page directory table is located in the main memory and is formed by a number of page directory entries 432. The paging mechanism utilizes the directory index 412 to discern the correct page directory entry for the linear address. In turn, each page directory entry points to the page table 440 which is composed of a number of page table entries 442. The page table index 414 is then used to select the appropriate page table entry for the particular linear address 410. Each page table entry contains a page frame field 444 for storing a page frame, and a present indicator 448 that specifies whether a given page 450 is currently mapped to a physical page of the main memory 220. A page frame is a physical address in the main memory to which a page of virtual memory can be mapped. The present indicator specifies whether the data contained within the page frame address is valid for address translation purposes. More specifically, the present indicator can have one of two states: a present state that indicates that the date in the page frame field is valid and therefore the respective virtual page is currently mapped to physical page, or a not-present state that indicates that the data in the page frame field is not valid and therefore the respective virtual page is not currently mapped to physical page.

When an accessing module attempts to reference a page whose present indicator 448 is in the present state, the page table entry 442 points to a valid page frame 450. Having identified the page frame, the page frame offset 416 is then used to identify a physical target address 455 that corresponds to the linear address 410. In this manner, the paging mechanism translates linear addresses into physical addresses. However, because this translation process requires a two-tier table look up, the translation process is time-consuming. Consequently, the microprocessor provides a page table cache 470 (also known as a translation-look aside-buffer or TLB) for storing a predetermined number of most recently used page table entries. The page table cache is similar to the previously described segment descriptor cache register 360 in that both are caches are contained within the microprocessor and are provided to reduce address look up times. More specifically, the microprocessor scans the entries contained within the page table cache in order to determine a page frame without having to undergo the previously described table translation process. When the software program can ensure that all the entries contained within the page table cache are not valid (e.g., when all the entries contain page frames for pages that are no longer present in the main memory), the software program clears the page table entries contained within the page table cache. This clearing process is known as flushing. The page table cache can be flushed by reloading the page directory base address register. This flushing process is relatively costly in terms of processing time. However, it is not as costly as continuously attempting to locate page frames via the page table cache when the desired page frames are no longer present in main memory.

Alternatively, when an accessing module attempts to reference a page whose present indicator is in the not-present state, the microprocessor generates a page fault. A page fault is an interrupt that is generated whenever software attempts to read or to write to a visual memory address that is not mapped to a physical memory address. In brief, this interrupt relays the linear memory address that was responsible for generating the page fault. A software program responds to page faults by loading and modifying the page table entry 442 that corresponds to the linear memory address (i.e., by loading a valid page frame in the page frame address field 444 and by setting the present indicator 448 to the present state).

The present invention utilizes virtual addressing and a paging mechanism in order to provide accessing modules with a convenient interface to a banked peripheral memory. In its preferred embodiment, the present invention is incorporated in the previously referenced operating system 226. More specifically, a majority of the present invention's inventive steps and features are embodied in the operating system page fault handler 228. This page fault handler obviates the need for an accessing module to constantly ensure that a proper bank 244 of the banked peripheral memory 242 is mapped into the host memory region 229. Again, by obviating this need, the code of the accessing module is simplified and more quickly executed by the central processing unit.

Figure 5:
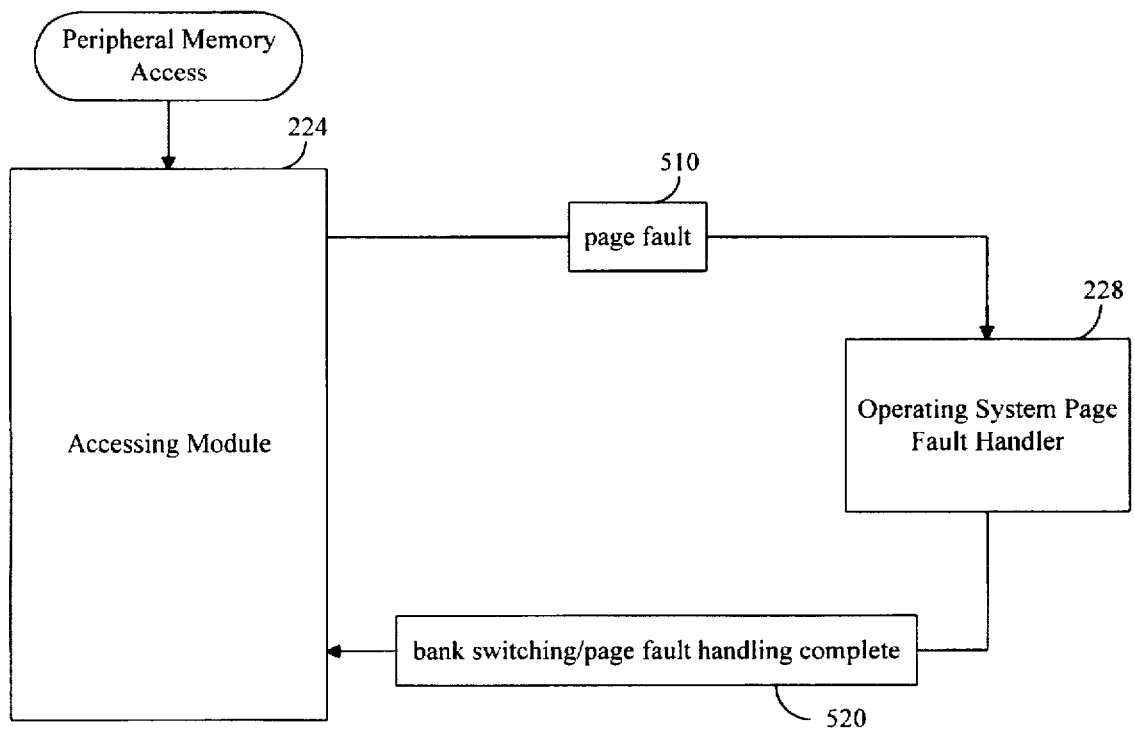
FIG. 5 illustrates the decoupling of an accessing module and a page fault handler in the present invention.

Conceptually, the decoupling of an accessing module and the operating system page fault handler is illustrated in FIG. 5. In the discussion below, the accessing module will be referred to as a device driver 224. The present invention provides a linear address space that simulates the banked peripheral memory 242. The device driver uses this linear address space as an interface to the banked peripheral memory. When the device driver attempts to access a page of the linear address space that is not marked as present, a page fault exception (Pathway 510) causes processing control to be passed to the operating system page fault handler 228. The operating system page fault handler determines the peripheral memory bank 244 that is needed to satisfy the device driver's request and maps the needed bank in the host memory region 229. Additionally, the operating system page fault handler ensures that the representative address of the linear address space is also mapped to the host memory region. After conducting the necessary bank switching and mapping of the linear address space's pages, the operating system page fault handler allows the device driver to recapture processing control (Pathway 520). In this manner, the device driver program can access any location within the banked peripheral memory by simply addressing the provided linear address space.

Figure 6:
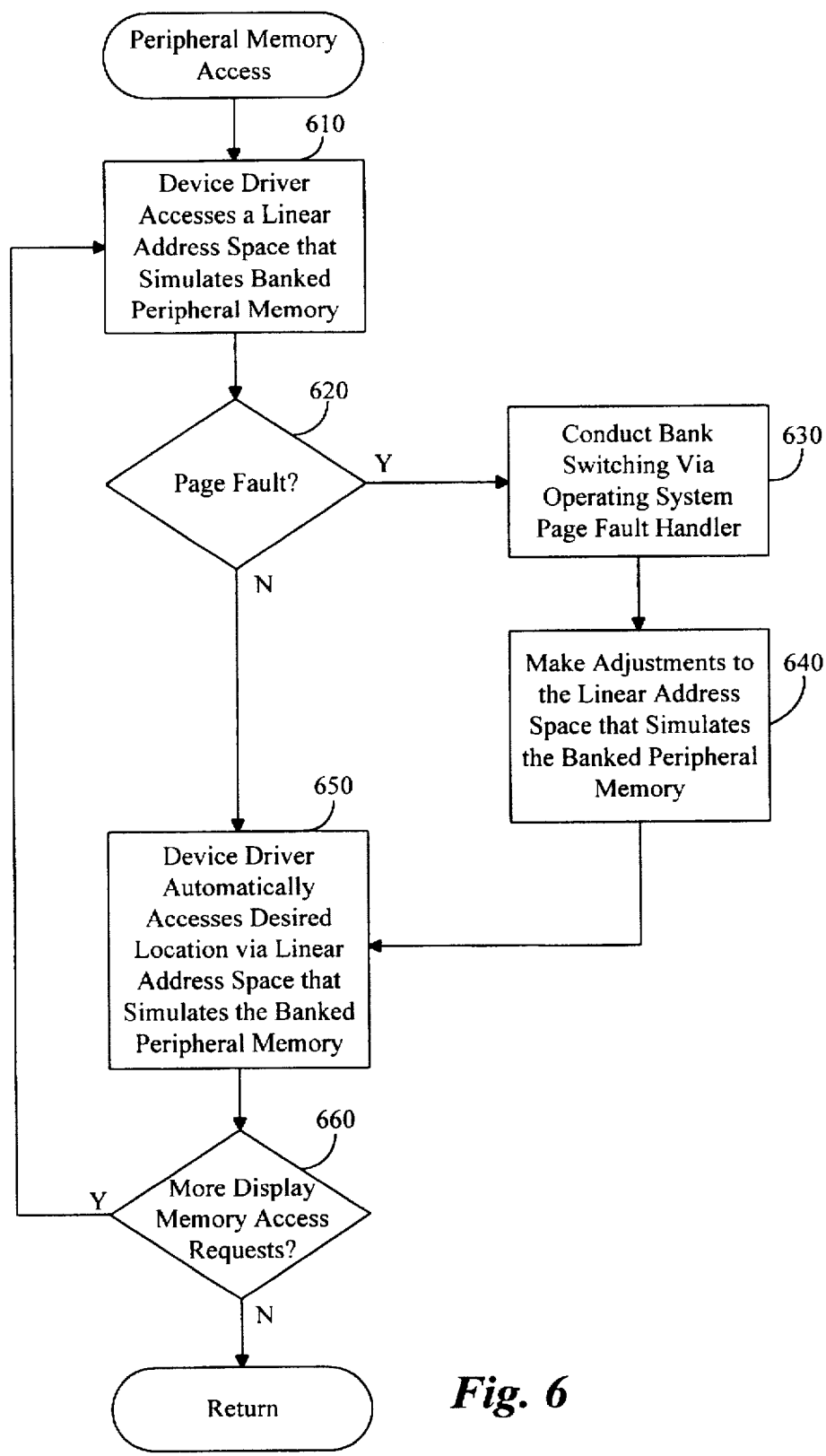
FIG. 6 is a flow diagram for the processing steps for accessing peripheral memory in the present invention.

FIG. 6 is a flow diagram that illustrates these processing steps in greater detail. The steps begin when the device driver accesses the linear address space that simulates the banked peripheral memory 242 (step 610). When the device driver attempts to access an address of the linear address space that is not currently represented by a physical address of the main memory 220, the paging mechanism of the central processing unit generates a page fault (step 620). The interrupt servicing routine 225 informs the operating system page fault handler that the central processing unit has generated a page fault for the linear address space that simulates the banked peripheral memory. Subsequently, the operating system page fault handler determines, by examining the address responsible for the generation of the page fault, a bank 244 of the bank peripheral memory that is necessary to satisfy the device driver's access request (step 630). After making this determination, the operating system page fault handler maps the needed bank into the host memory region 229. The operating system page fault handler also maps pages of the linear address space that simulate the corresponding bank into the host memory region (step 640). After mapping these pages, the operating system page fault handler's responsibilities are complete. Subsequently, the device driver can access the desired memory location via the linear address space (step 650). The above-described steps are continuously executed until the device driver has accessed all of its desired memory locations (steps 660 and 610–650).

In its preferred embodiment, the present invention is a facility that allows an accessing module to treat a banked peripheral memory 242 as a linear memory buffer. The facility furnishes a linear address space having a present region that is mapped to the host memory region 229. The facility also furnishes a selector that provides access to a portion of the linear address space. Preferably this selector has (1) a base address that defines its starting position within the linear address space and (2) a limit that defines its size. This selector is provided to receive peripheral memory access requests from accessing modules. By selectively positioning the selector around the present region of the linear address space, the facility provides access to the entire range of the banked peripheral memory. As the selector is positioned around a static present region, the facility does not require the modification of page table entries or the flushing of the page table cache.

Having described the present invention generally, the present invention will now be described in detail with reference to FIGS. 7–10. More specifically, the present invention will be described as a facility that allows a device driver 224 to access any location of a banked video memory 244 via a linear address space.

Figure 7:
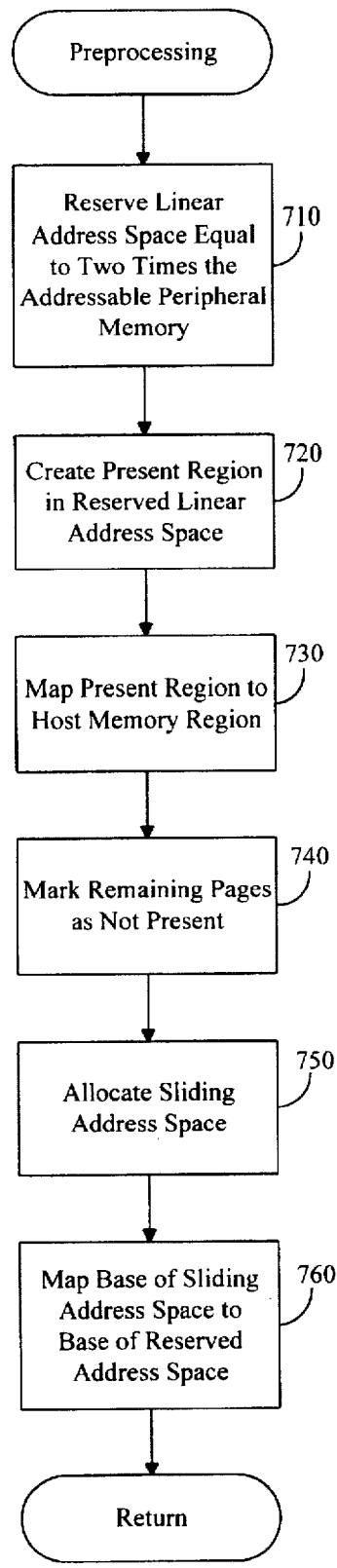
FIG. 7 is a flow diagram for the preprocessing steps of a preferred embodiment of the present invention.

FIG. 7 is a flow diagram for the preprocessing steps of a preferred embodiment of the present invention. More specifically, FIG. 7 illustrates the steps used in setting up a linear address space and a selector which, in conjunction, provide a facility that allows the device driver 224 to access the banked peripheral memory 242 without requiring the device driver to conduct any bank switching. Furthermore, the facility provides access to every memory location contained within the banked peripheral memory without requiring the updating of any page table entries 442 or the flushing of the page table cache 470.

The facility begins by reserving a linear address space that is equal to twice the amount of memory that is available in the banked peripheral memory 244 (step 710). In a preferred form of the facility, an operating system component reserves this linear address space by allocating a segment selector 310 in the previously described manner (i.e., by specifying a base address 340 and a segment limit 350). Additionally, the facility sets the privilege level via the previously described selector attributes 314 so that only the operating system page fault handler has access to this linear address space. The sizing of this linear address space can be explained with reference to the banked video memory contained on Super VGA adapter cards. Typically, these adapter cards contain one megabyte of banked video memory. Consequently, to provide access to memory of this type, the facility reserves a 2 megabyte linear address space. Such a linear address space is illustrated by block 810 of FIG. 8a. As previously mentioned, computer systems do not possess enough addressable main memory 220 to allow all of this video memory to be immediately accessible. Consequently, computer systems allocate the previously described host memory region 229 to allow selected banks 244 of the banked peripheral memory 242 to be swapped into the main memory as they are needed. For example, in computer systems adhering to the architecture originally promulgated by International Business Machines, Inc. (IBM™), a 64 kilobyte region beginning at A0000x is provided as the host memory region for the addressable video memory that exists on Super VGA adapter cards. Desired banks are swapped into the host memory region by specifying a bank number to the video adapter card 240. In brief, this information is relayed to the video adapter card by loading a control register and outputting the register via a port. By convention, ports are memory locations which are dedicated to the sending and receiving of data. The actual configuration of such a control register is not included herein as neither the configuration of such a control register nor the specific process employed for mapping a desired bank into the host memory region comprises a limitation of the present invention.

The facility continues with the preprocessing steps by marking a predetermined number of consecutive virtual pages that form the linear address space 810 as present (step 720). As mentioned above, marking these pages as present indicates that they are mapped to physical pages of the main memory 220. These pages are marked as present by setting the present indicator 448 into the present state for each respective page table entry 442. Hereafter, these pages will be collectively referred to as the present region 820. Ideally, the size of the present region is equal to the size of the host memory region 229 and is located immediately past a middle point of the linear address space. For example, in computer systems that adhere to the IBM architecture, the host memory region for video memory is 64 kilobytes (i.e., A0000x–AFFFFx). As the Intel microprocessor reserves the low-order 12-bits for the page frame offset 416, the microprocessor provides pages that are 4 kilobytes in size. Consequently, in a computer system that adheres to this architecture, the ideal predetermined number of pages is 16.

The present invention continues with its preprocessing steps by mapping the pages of the present region to the host memory region (step 730). For example, where the host memory region ranges from A0000x–AFFFFx, these pages are mapped by loading the page frame field 444 of each respective page table entry 442 with the physical addresses A0, A1, A2 . . . AF. The operating system component then marks the remaining pages of the linear address space as not present by setting their respective present indicators into the not-present state (step 740). The present invention has now completed the organization of the linear address space.

The facility also allocates a selector 840 that simulates the banked peripheral memory 242 as a contiguous linear address space (step 750). More specifically, the device driver 224 references addresses contained within this selector to access the physical memory locations of the banked peripheral memory. As will be explained in more detail below, the present invention repositions the selector within the linear address space 810 so that the referenced locations of the selector overlap the linear address space's present region. This repositioning process allows the device driver to access any desired memory location of the banked peripheral memory that is mapped into the present region of the linear address space. As this repositioning process resembles sliding the selector within the linear address space, the remaining portion of this discussion refers to the selector as the "sliding selector."

Similar to the linear address space 810, the sliding selector 840 is allocated by specifying a segment selector 310 having a base address 340 and a segment limit 350. In this case, the segment limit is sized equally to the banked peripheral memory 244. By allocating the sliding selector to be of this size, the selector will contain a virtual address for each physical memory location of the banked peripheral memory. Additionally, when allocating the sliding selector, the present invention sets the previously described selector attributes 314 so that the device driver 224 can access the sliding selector.

The facility completes the preprocessing steps by setting the base address of the sliding selector 840 to equal the base address of the linear address space 810 (step 760). The configuration shown in FIG. 8A conceptually illustrates the positioning of the sliding selector when its base address is equivalent to the base address of the linear address space. In this configuration, all the addresses of the sliding selector are mapped to the upper region 812 of the linear address space. As the pages of the upper region are marked as not present, any attempt to access the sliding selector causes the central processing unit to generate a page fault. This page fault is referenced by Pathway 510, and steps 610 and 620. In turn, the interrupt servicing routine 225 notifies the operating system page fault handler 228 of the page fault. The operating system page fault handler then conducts the necessary bank switching and makes adjustments to the linear address space in order to allow the device driver to access the desired memory locations (steps 630, 640, and 650).

Figure 9:
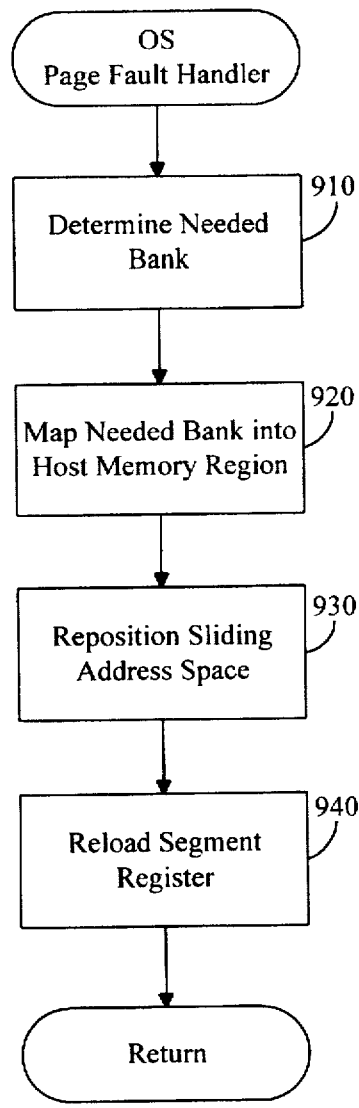
FIG. 9 is flow diagram for the processing steps of an operating system page fault handler that is used in the preferred embodiment of the present invention.

FIG. 9 is a flow diagram for processing steps of the operating system page fault handler 228 as it exists in the preferred embodiment of the present invention. As will be explained in more detail below, the page fault handler maps needed banks 244 of the peripheral memory 242 into the host memory region 229 and adjusts the sliding selector 840 so that the address responsible for the generation of the page fault maps to a corresponding physical memory location of the needed bank.

Upon notification of the page fault, the operating system page fault handler 228 determines the bank that is needed to satisfy the device driver's access request (step 910). More specifically, the operating system page fault handler determines the needed bank as a function of the address that was responsible for the generation of the page fault exception, the current base address 340 of the sliding selector, and the size of the banks 244 that form the banked peripheral memory 242. More specifically, the address responsible for the generation of the page fault (hereafter "faulting address") is provided to the operating system page fault handler via the central processing unit. The faulting address is the linear address of the sliding selector 840 that the device driver has attempted to access.

In a first embodiment, the facility determines the needed bank using a centering mechanism. In such an embodiment the needed bank is defined by a starting address and an ending address with the faulting address being an address positioned at an approximate midpoint between the starting address and the ending address. As will be explained in more detail below, this needed bank is then mapped to the host memory region (step 920). By mapping the faulting address to the approximate midpoint of the host memory region, subsequent accesses to the sliding selector are less likely to generate page faults. As a result, processing overhead is minimized.

In an alternative embodiment, the operating system page fault handler determines a bank identifier for the needed bank by subtracting the sliding selector's base address from the faulting address and dividing the result by the size of the banks that form the peripheral memory. This bank identifier serves to specify the needed bank from the banks of the peripheral memory. In this example, the bank identifiers are numerical identifiers that are numbered sequentially from 0 to n−1, where n represents the total number of banks that form the peripheral memory. In summary, this embodiment determines the bank identifier using the following relationship in which "Int" designates the integer result of the bracketed operation:

Bank Identifier for the Needed Bank=

$$Int\left(\frac{\text{Faulting Address} - \text{Current Base Address of Sliding Selector}}{\text{Bank Size}}\right) \quad (1)$$

Figure 8A:
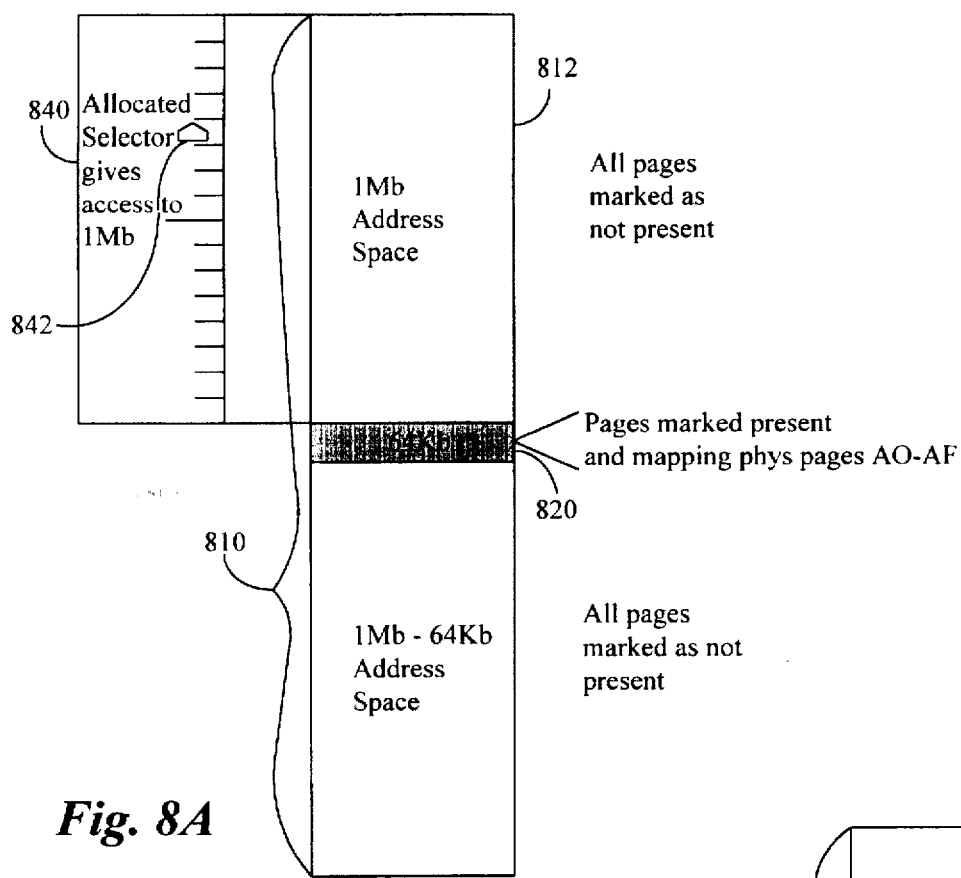
FIG. 8A illustrates a banked peripheral memory and further illustrates a linear address space in which a selector is positioned in the present invention.

The performance of the operating system page fault handler will now be explained by way of example with reference to FIGS. 8A and 8B. In this example, the device driver 224 has attempted to access an address of the sliding selector 840 that corresponds to a physical memory location contained within the fifth bank of the banked peripheral memory 242 (step 610). Conceptually, such an address is illustrated by reference 842. As explained above, initially this address is mapped to a page of the linear address space 810 that is marked as not present (i.e., a page of the upper region 812). Consequently, the central processing unit generates a page fault (Pathway 510 and step 620, YES Pathway). In this case, where that bank size is represented by "S" and the current base address is represented by "CBA," the faulting address is necessarily represented by "CBA+ Offset," where "Offset" signifies the position of the faulting address relative to the base address of the sliding selector. Thus, the above equation becomes:

Bank Identifier for the Needed Bank=

$$Int\left(\frac{(CBA + \text{Offset}) - CBA}{S}\right) \quad (2)$$

Moreover, as the faulting address 842 is necessarily an address located more than four bank sizes away from the base address 340 of the sliding selector 840 but less than five bank sizes away from the base address of the sliding selector, the equation becomes:

Bank Identifier for Needed Bank=

$$Int\left(\frac{\text{Offset}}{S}\right) = Int\left(\frac{4S \leq \text{Offset} \leq 5S}{S}\right) = 4 \quad (3)$$

As mentioned above, by convention the bank identifiers are numbered from 0 to n−1. Thus, "4" properly identifies the fifth bank 244 of the banked peripheral memory 242. Having determined the bank identifier for the needed bank, the operating system page fault handler 228 maps the needed bank into the host memory region 229 (step 920). As mentioned above, the needed bank is mapped to the host memory region by outputting the bank identifier to the video adapter card 240. Additionally, the operating system fault handler repositions the sliding selector 840 so that the virtual bank that contains the faulting address 842 maps to the present region 820 of the linear address space 810 (step 930). As the present region is mapped to the host memory region (step 730) and the needed bank is also mapped to the host memory region (step 920), repositioning the sliding selector in this manner allows the device driver 224 to access its requested memory locations of the banked peripheral memory 242 (Pathway 520, step 650). In its preferred embodiment, the operating system page fault handler repositions the sliding selector by modifying its base address 340 in the segment descriptor table 320. The present invention determines a new base address for the sliding selector by subtracting the product of the bank size and the bank identifier from the starting linear address of the present region. In summary, this preferred embodiment determines a new base address for the sliding selector using the following relationship:

New Base Address for Sliding Selector=(Starting Linear Address of Present Region)−(Bank Size)(Bank Identifier for the Needed Bank) (4)

Continuing with the example wherein the device driver has attempted to access the fifth bank of the banked peripheral memory 242, the operating system page fault handler 228 repositions the sliding selector 840 by setting its base address 340 to be equal to the starting linear address of the present region 820 less an offset that is equal to 4 bank sizes. Alternatively, where "SAPR" represents the starting linear address of the present region, the above equation becomes:

New Base Address for Sliding Selector=(SAPR−4S) (5)

Figure 8B:
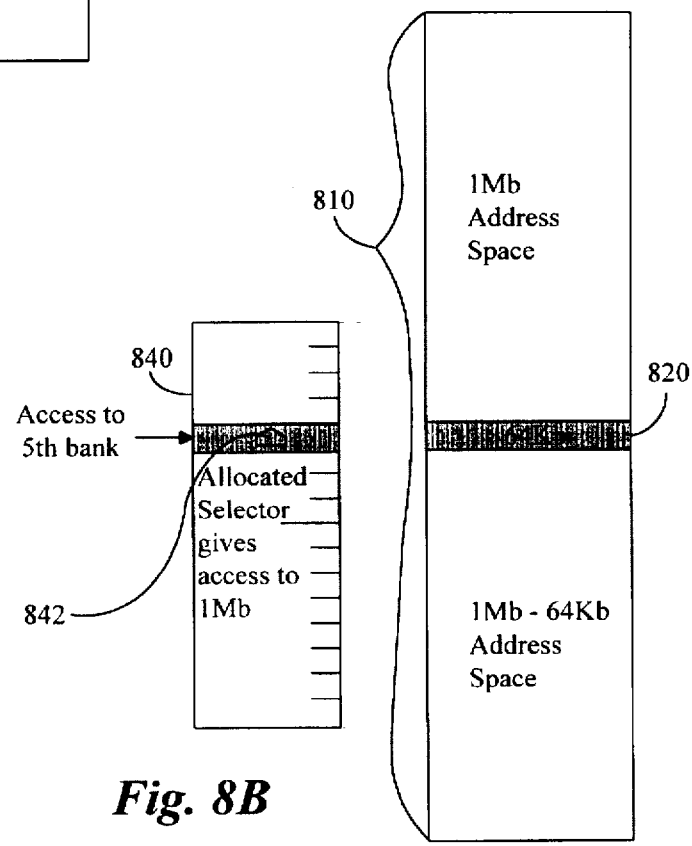
FIG. 8B illustrates a repositioning of the selector in the banked peripheral memory.

The resulting positioning of the sliding selector is illustrated in FIG. 8B.

After determining a new base address 340 for the sliding selector 840, the operating system page fault handler 228 stores the new base address in the segment descriptor 330. To ensure that the control processing unit 230 properly addresses the sliding selector, the present invention reloads the segment register 305 that the device driver 224 is using to access the sliding selector (step 940). As mentioned above, each time that a segment register is loaded with a segment selector, the Intel microprocessor reloads the segment descriptor cache register 360. Therefore, the reloading segment register automatically reloads the cache register with the new base address of the sliding selector. The needed segment register is made available to the present invention via the central processing unit. More specifically, when the central processing unit 230 generates the page fault, it not only forwards the fault address to the interrupt servicing routine 225 but also forwards the segment register containing the fault address. After the operating system page fault handler has reloaded the segment register, the operating system page fault handler's responsibilities are complete. Consequently, the operating system returns control to the device driver so that the device driver can access the desired location of the host memory region 229 (Pathway 520, step 650).

In this manner, the present invention allows the device driver 224 to access any physical memory location of the banked peripheral memory 242 via the sliding selector 840. By providing access to the bank peripheral memory in this manner, the present invention greatly simplifies the device driver's code. Moreover, as the facility provides access to the entire bank peripheral memory without modifying any page table entries or flushing the page table cache, processing overhead is kept to a minimum. Consequently, the device driver executes very quickly. Furthermore, as the device driver is not tightly linked to the requirements of either the video adapter card 240 or the hardware constraints of the computer system 200, the driver code does not have to be updated should these requirements or constraints change.

The above-described detailed description explains functioning preferred embodiments of the present invention. These preferred embodiments may be optimized in accordance to a particular need or a particular environment in which the invention is used. For example, in computer systems where it is desired to quickly transfer data between differing areas of a banked peripheral memory, one can set up two sliding selectors: a first sliding selector to read the data and a second sliding selector to write data. When using such an optimization, the differing areas (i.e., the read and write areas) of the banked peripheral memory are typically mapped to the same host memory region. With the read and write areas mapped to the host memory region, the "read sliding selector" is positioned so that it maps to the "read area" of the host memory region. Similarly, the "write sliding selector" is positioned so as to map to the "write area" of the host memory region. By positioning the two sliding selectors in this manner and using the operating system page fault handler as described above, the present invention provides a highly efficient method and apparatus for transferring data between differing regions of a banked peripheral memory. Such a method and apparatus is, for example, compatible with the VGAWonder video controllers manufactured by ATI, Inc. As is well known to those skilled in the art, these controllers provide for a dual paging mode that permits one page of display memory to be enabled for reading while another page is enabled for writing.

Figure 10:
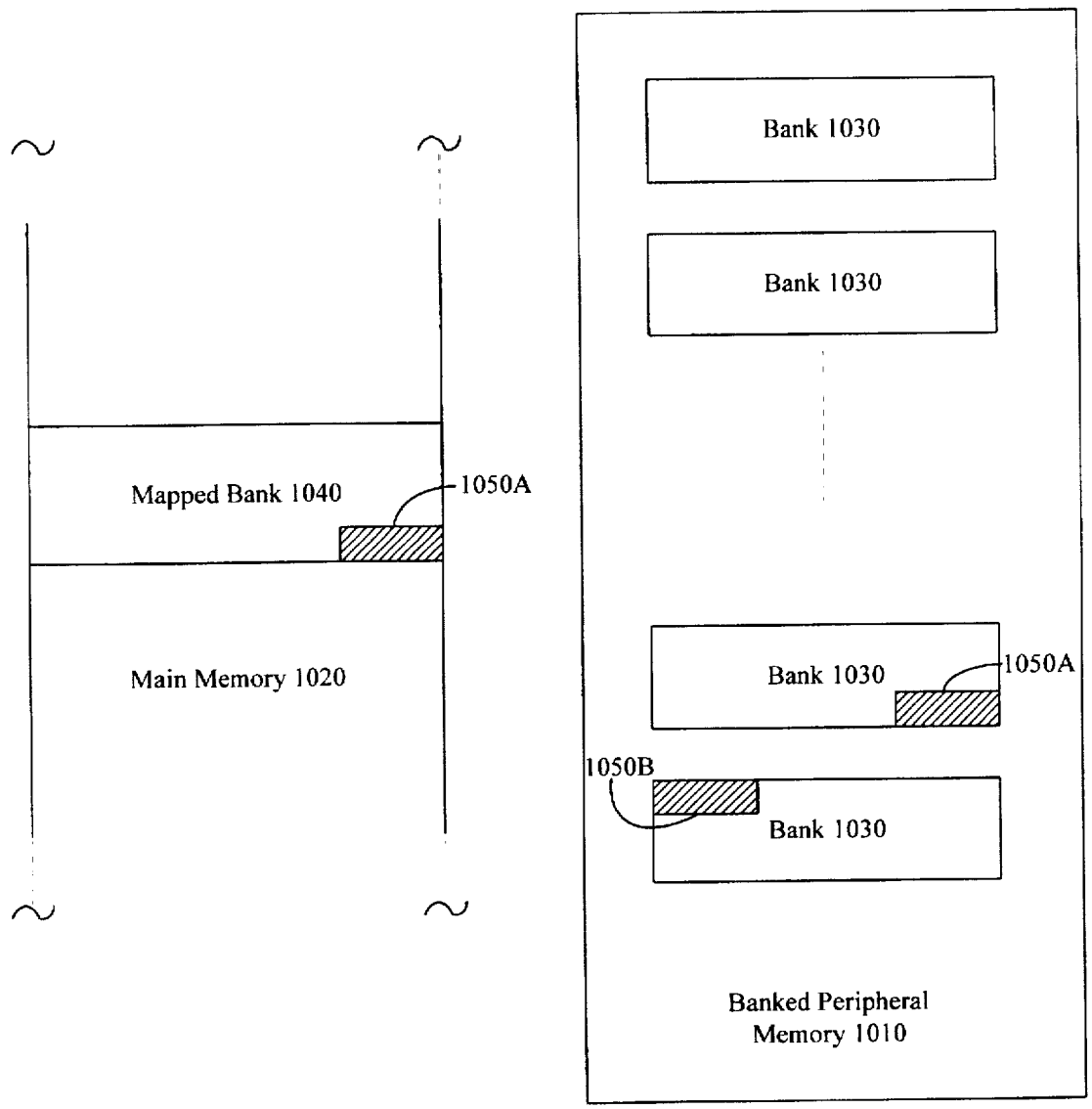
FIG. 10 illustrates a potentially infinite page fault condition.

Another possible optimization that can be selectively added to the preferred embodiments described above relates to an infinite page fault problem. More specifically, when an accessing module attempts to read or write to an address of the banked peripheral memory that crosses a bank boundary, that address has the potential for causing an infinite page fault. This potential is realized when the bank boundary in mapped to a boundary of the host memory region. Such a scenario is illustrated in FIG. 10. This figure illustrates a banked peripheral memory 1010 and a computer system's main memory 1020. As described above, this banked peripheral memory is formed by series of banks 1030 that are selectively mapped into the host memory region. FIG. 10 shows the host memory region as containing a mapped bank 1040.

For purposes of example, assume that an accessing module desires to access an address that is formed by memory locations 1050A and 1050B. As illustrated, this address crosses a bank boundary. Moreover, the upper bank that defines this boundary is mapped to a boundary of the host memory region 1010. When the operating system page fault handler attempts to write to such an address, an infinite page faulting condition can occur. This condition can occur because, as illustrated, an attempt to access memory location 1050B will generate a page fault. In an attempt to satisfy this page fault, a non-optimal page fault handler would simply map the bank containing memory location 1050B into the host memory region. However, a page fault condition would still exist as a page fault would now be generated when memory location 1050A was attempted to be accessed.

A preferred solution to this problem deconstructs the memory access request into constituent parts, where the constituent parts do not cause a page fault. For example, instead of attempting to satisfy the memory access request by simultaneously accessing memory locations 1050A and 1050B, a preferred embodiment breaks down the memory access request into two distinct memory access requests: the first servicing memory location 1050A and the second servicing 1050B. More specifically, the page fault handler, upon receipt of a page fault, examines the page fault address to discern whether the page fault was generated by an address that spans a bank boundary. When the page fault was generated by such an address, the page fault handler first accesses the portion of the address (i.e., 1050A) that is currently mapped to the host memory region. After accessing this portion of the address, the page fault handler maps the bank that contains the remaining portion of the address (i.e., 1050B) into the host memory region. After mapping this bank, the remaining portion of the address is accessed in the previously described manner. Thus, this optimization presents a clean and robust solution to the problem of infinite page faults.

The detailed description provided above represents illustrates preferred embodiments of the present invention. This description will enable those skilled in the art to make various modifications to these embodiments without departing from the spirit and scope of the invention. For example, while the embodiments of the present invention have been described with reference to the banked peripheral memory of a video adapter card those skilled in the art will appreciate that the inventive concepts disclosed herein are equally applicable to all types of banked memory (e.g., expanded memory). Similarly, while the present invention has been described with reference to Intel microprocessors and computer systems employing an IBM architecture, those skilled in the art will recognize that the present invention is not constrained to any particular central processing unit or its surrounding architecture. Accordingly, the invention is not limited except as by the appended claims.

We claim:

1. In a computer system having a central processing unit that provides a paging mechanism for mapping virtual pages to physical pages, the paging mechanism utilizing a page table entry for each of the virtual pages, each page table entry containing a field for specifying a location of a physical page, a peripheral memory that is comprised of a plurality of banks, a main memory having a host memory region that is formed by a predetermined number of physical pages so that the host memory region allows access to only a fraction of the banks of the peripheral memory at any one time, a method for providing access to the peripheral memory, the method comprising the steps of:

provinding a linear address space that is formed by a plurality of virtual pages, the linear address space having a present region that is formed by mapping at least one of the virtual pages to one of the physical pages of the host memory region;

providing a segment selector for a segment, wherein the segment has a size that approximates a size of the peripheral memory;

receiving a peripheral memory access request;

determining a bank of the peripheral memory that is needed to satisfy the peripheral memory access request;

mapping the needed bank into the host memory region; and assigning a value to the segment selector in the linear address space so as to satisfy the peripheral memory access requests without modifying the page table entries of the linear address space.

2. The method of claim 1 wherein the segment selector comprises a base address for specifying a position of the segment and wherein the step of assigning a value to the segment selector in the linear address space so as to satisfy the peripheral memory access requests without modifying the page table entries of the linear address space comprises the steps of:

determining a region of the segment that simulates the needed bank; and adjusting the base address of the segment selector, so that the determined region of the segment maps to the present region of the linear address space.

3. The method of claim 1 wherein the linear address space is approximately twice the size of the peripheral memory and wherein the present region of the linear address space is positioned at an approximate midpoint of the linear address space.

4. In a computer system having a hardware window that permits a program module to access only a fraction of a total amount of an addressable memory at a time, a method for allowing the module to address the addressable memory as a contiguous linear buffer, the method comprising the steps of:

reserving an address space that is at least equal in size with the addressable memory;

mapping a portion of the reserved address space to the hardware window;

providing a linear representation of the addressable memory by allocating a linear address segment having a predetermined size that is approximately equal to the total amount of the addressable memory, the linear representation of the addressable memory serving as an interface between the module and the addressable memory;

positioning the linear address segment so that it is mapped within the reserved address space;

determining when the program module is attempting to access an address of the linear address segment that does not translate to the mapped portion of the reserved address space;

determining an address of the addressable memory that corresponds to the address of the linear address segment that the program module is attempting to access;

mapping the determined address of the addressable memory into the hardware window; and repositioning the linear address segment so that the address of the linear address segment that the program module is attempting to access maps to the determined address of the addressable memory.

5. The method of claim 4 wherein the linear address segment comprises a base address field for specifying a starting address of the linear address segment, and wherein the step of repositioning the linear address segment comprises the step of:

modifying the base address of the linear address segment.

6. The method of claim 4 wherein the reserved linear address space is approximately twice as large as the addressable memory, and wherein the portion of the reserved address space that is mapped to the hardware window is positioned approximately midway in the reserved linear address space.

7. In a computer system having a central processing unit that provides a paging mechanism for translating virtual pages to physical pages, a peripheral memory formed by a plurality of banks, and a main memory having a host access region for switching the banks of the peripheral memory into the main memory, a method for simulating the peripheral memory as a contiguous memory buffer to allow a program module to access the peripheral memory without requiring the module to conduct any bank switching or to respond to any page faults, the method comprising the steps of:

reserving a first linear address space, the first linear address space being comprised of a plurality of virtual pages;

forming a present region within the first linear address space by mapping a predetermined number of the plurality of virtual pages to the host access region;

allocating a second linear address space in which a peripheral memory access request is received from the program module; and providing a page fault handler to determine a bank of the peripheral memory that is needed to satisfy the peripheral memory access request, to map the needed bank into the host access region, to determine a portion of the second linear address space that simulates the needed bank, and to position the second linear address space within the first linear address space so that the determined portion of the second linear address space maps to the host access region via the present region of the first linear address space.

8. The method of claim 7 wherein the second linear address space comprises a base address for specifying a position of the second linear address space and wherein the page fault handler positions the second linear address space within the first linear address space by modifying the base address.

9. The method of claim 7 wherein the first linear address space is approximately twice the size of the peripheral memory and wherein the present region of the first linear address space is positioned at an approximate midpoint of the first linear address space.

10. In a computer system having a peripheral memory that is formed by a plurality of banks, a designated memory region that provides access to only a fraction of the plurality of banks at any given time, an apparatus for simulating simultaneous access to the plurality of banks, the apparatus comprising:

a linear address space having a portion that is mapped to the designated memory region:

a sliding address segment that is positioned within the linear address space, wherein the sliding address segment simulates the plurality of memory banks as a continuous linear memory buffer and receives a peripheral memory access request; and a fault handler that determines, from the plurality of banks, a bank that is needed to satisfy the peripheral memory access request, maps the needed bank to the designated memory region, determines a portion of the sliding address segment that corresponds to the needed bank, and adjusts the positioning of the sliding address segment so that the portion of the sliding address segment that corresponds to the needed bank maps to the designated memory region.

11. The apparatus of claim 10 wherein the sliding address segment has a base address, and wherein the fault handler adjusts the positioning of the sliding address segment by its base address.

12. The apparatus of claim 10 wherein the linear address space is approximately twice the size of the sliding address segment, and wherein the present region is positioned at the approximate midpoint of the linear address space.

13. The apparatus of claim 10 wherein the computer system further comprises an operating system, wherein the fault handler is an operating system and wherein the peripheral memory access request is received from a device driver.

14. In a computer system having a host memory region for providing access to a limited region of a banked peripheral memory, the banked peripheral memory being formed by a plurality of banks, a method for providing access to the banked peripheral memory, the method comprising the steps of:

providing a segment selector for a segment that simulates the banked peripheral memory as a contiguous linear buffer;

providing a linear address space in which the provided segment selector is positioned;

mapping a portion of the provided linear address space to the host memory region;

receiving memory access requests from accessing modules, the received memory access request referencing an address in the provided segment; and when the referenced address of the provided segment selector is not mapped to the portion of the linear address space that is mapped to the host memory region, positioning the segment selector so that the referenced address maps to the portion of the linear address space that is mapped to the host memory region, determining a bank, from among the plurality of banks that form the banked peripheral memory, that contains a memory location that is simulated by the referenced address of the memory access request, and mapping the determined bank to the host memory region.

15. The method of claim 14 wherein the step of mapping the determined bank to the host memory region comprises the step of:

mapping the memory location that is simulated by the referenced address of the memory access request to the approximate midpoint of the host memory region.

16. In a computer system having a host memory region that provides access to a portion of a banked peripheral memory that is formed by a plurality of banks, a method for responding to a memory access request received from a program module, the memory access request being for an address in a segment that is identified by a segment selector and that simulates the banked peripheral memory as a contiguous buffer, the memory access request specifying an address that the program module desires to access, the selector being positioned within a linear address space having a present region that is mapped to the host memory region, the method comprising the step of:

when the desired address of the received memory access request is an address that simulates memory locations of the banked peripheral memory that cross a bank boundary, the bank boundary being defined by an ending memory location of a first bank and a starting memory location of a second bank,
sliding the selector in the linear address space so that the desired address of the memory access request maps to the host memory region;
deconstructing the received memory access request into a first part and a second part, wherein the first part of the deconstructed memory access request references only memory locations contained in the first bank and wherein the second part of the deconstructed memory access request references only memory locations of the second bank,
mapping the first bank into the host memory region to respond to the first part of the deconstructed memory access request, and
mapping the second bank into the host memory region to respond to the second part of the deconstructed memory access request.

17. In a computer system having a host memory region that provides limited access to a banked peripheral memory through a host memory region of a main memory, wherein the banked peripheral memory is formed by a plurality of banks, an apparatus that permits a program module to easily access the banked peripheral memory, the apparatus comprising:

means for receiving, from the program module, a memory access request in a segment that is identified by a segment selector and that simulates the banked peripheral memory as a linear buffer, the memory access request providing a desired address of the segment that the program module wishes to access wherein the desired address simulates a corresponding memory location of the banked peripheral memory;
means for positioning, in response to the received memory access request, the segment selector in a linear address space that is partially mapped to the host memory region;
means for determining a bank of the banked peripheral memory that is needed to satisfy the memory access request; and
means for mapping the determined bank to the host memory region.

18. The apparatus of claim 17 wherein the means for mapping the determined bank to the host memory region comprises:

means for mapping the corresponding memory location of the banked peripheral memory to the approximate midpoint of the host memory region.

19. The apparatus of claim 17 wherein the linear address space is approximately twice the size of the banked peripheral memory.

20. In a computer system having a host memory region that provides access to a limited region of a banked peripheral memory that is formed by a plurality of banks, a method for providing access to the banked peripheral memory, the method comprising the steps of:

providing a first segment selector for a first segment and a second selector for a second segment wherein each segment simulates the banked peripheral memory as a contiguous linear buffer, wherein the first segment selector is used in servicing an input peripheral memory access request, and wherein the second segment selector is used in servicing an output peripheral memory access request, each respective peripheral memory access request referencing an address of the respective selector that the module desires to access;
providing a linear address space in which the provided segment selectors are positioned;
mapping a portion of the provided linear address space to the host memory region;
after receiving the input peripheral memory access request,
determining whether the referenced address of the first segment selector is mapped to the portion of the linear address space that is mapped to the host memory region;
when the referenced address of the first segment selector is not mapped to the portion of the linear address space that is mapped to the host memory region,
positioning the first segment selector so that the referenced address maps to the portion of the linear address space that is mapped to the host memory region,
determining a bank, from among the plurality of banks that form the banked peripheral memory, that contains a memory location that is simulated by the referenced address of the input peripheral memory access request, and
mapping the determined bank to the host memory region; and after receiving the output peripheral memory access request,
determining whether the referenced address of the second segment selector is mapped to the portion of the linear address space that is mapped to the host memory region;
when the referenced address of the second segment selector is not mapped to the portion of the linear address space that is mapped to the host memory region,
positioning the second segment selector so that the referenced address maps to the portion of the linear address space that is mapped to the host memory region,
discerning a bank, from among the plurality of banks that form the banked peripheral memory, that contains a memory location that is simulated by the referenced address of the output peripheral memory access request, and mapping the discerned bank to the host memory region.

21. The method of claim 20 wherein the step of mapping the determined bank to the host memory region:

mapping the memory location that is simulated by the referenced address of the memory access request to the approximate midpoint of the host memory region.

22. In a computer system having a central processing unit that provides a paging mechanism for mapping virtual pages to physical pages, the paging mechanism utilizing a page table entry for each of the virtual pages, each page table entry containing a field for specifying a location of a physical page, a peripheral memory that is comprised of a plurality of banks, a main memory having a host memory region that is formed by a predetermined number of physical pages so that the host memory region allows access to only a fraction of the banks of the peripheral memory at any one time, a computer-readable medium holding computer-executable instructions for performing a method for providing access to the peripheral memory, the method comprising the steps of:

providing a linear address space that is formed by a plurality of virtual pages, the linear address space having a present region that is formed by mapping at least one of the virtual pages to one of the physical pages of the host memory region;

providing a segment selector for a segment that is sized such that it approximates the peripheral memory;

receiving a peripheral memory access request;

determining a bank of the peripheral memory that is needed to satisfy the peripheral memory access request;

mapping the needed bank into the host memory region; and assigning a value to the segment selector in the linear address space so as to satisfy the peripheral memory access requests without modifying the page table entries of the linear address space.

23. The computer-readable medium of claim 22 wherein the segment selector comprises a base address for specifying a position of the segment and wherein the step of assigning a value to the segment selector in the linear address space so as to satisfy the peripheral memory access requests without modifying the page table entries of the linear address space comprises the steps of:

determining a region of the segment that simulates the needed bank; and adjusting the base address of the segment selector, so that the determined region of the segment maps to the present region of the linear address space.

24. In a computer system having a hardware window that permits a program module to access only a fraction of a total amount of an addressable memory at a time, a computer-readable medium holding computer-executable instructions for performing a method for allowing the module to address the addressable memory as a contiguous linear buffer, the method comprising the steps of:

reserving an address space that is at least equal in size with the addressable memory;

mapping a portion of the reserved address space to the hardware window;

providing a linear representation of the addressable memory by allocating a linear address segment having a predetermined size that is approximately equal to the total amount of the addressable memory, the linear representation of the addressable memory serving as an interface between the module and the addressable memory;

positioning the linear address segment so that it is mapped within the reserved address space;

determining when the program module is attempting to access an address of the linear address segment that does not translate to the mapped portion of the reserved address space;

determining an address of the addressable memory that corresponds to the address of the linear address segment that the program module is attempting to access;

mapping the determined address of the addressable memory into the hardware window; and repositioning the linear address segment so that the address of the linear address segment that the program module is attempting to access maps to the determined address of the addressable memory.

25. The computer-readable medium of claim 24 wherein the linear address segment comprises a base address field for specifying a starting address of the linear address segment, and wherein the step of repositioning the linear address segment comprises the step of:

modifying the base address of the linear address segment.

26. The computer-readable medium of claim 24 wherein the reserved linear address space is approximately twice as large as the addressable memory, and wherein the portion of the reserved address space that is mapped to the hardware window is positioned approximately midway in the reserved linear address space.

27. In a computer system having a hardware window that permits a program module to access only a fraction of a total amount of an addressable memory at a time, a computer-readable medium holding computer-executable instructions for performing a method for allowing the module to address the addressable memory as a contiguous linear buffer, the method comprising the steps of:

reserving an address space that is at least equal in size with the addressable memory;

mapping a portion of the reserved address space to the hardware window;

providing a linear representation of the addressable memory by allocating a linear address segment having a predetermined size that is approximately equal to the total amount of the addressable memory, the linear representation of the addressable memory serving as an interface between the module and the addressable memory;

positioning the linear address segment so that it is mapped within the reserved address space;

determining when the program module is attempting to access an address of the linear address segment that does not translate to the mapped portion of the reserved address space;

determining an address of the addressable memory that corresponds to the address of the linear address segment that the program module is attempting to access;

mapping the determined address of the addressable memory into the hardware window; and repositioning the linear address segment so that the address of the linear address segment that the program module is attempting to access maps to the determined address of the addressable memory.

28. The computer-readable medium of claim 27 wherein the second linear address space comprises a base address for specifying a position of the second linear address space and wherein the page fault handler positions the second linear address space within the first linear address space by modifying the base address.

29. The computer-readable medium of claim 27 wherein the first linear address space is approximately twice the size of the peripheral memory and wherein the present region of the first linear address space is positioned at an approximate midpoint of the first linear address space.

30. In a computer system having a host memory region for providing access to a limited region of a banked peripheral memory, the banked peripheral memory being formed by a plurality of banks, a computer-readable medium holding computer-executable instructions for performing a method for providing access to the banked peripheral memory, the method comprising the steps of:

providing a segment selector for a segment that simulates the banked peripheral memory as a contiguous linear buffer;

providing a linear address space in which the provided segment selector is positioned;

mapping a portion of the provided linear address space to the host memory region;

receiving memory access requests from accessing modules, the received memory access request referencing an address in the provided segment; and when the referenced address of the provided segment selector is not mapped to the portion of the linear address space that is mapped to the host memory region, positioning the segment selector so that the referenced address maps to the portion of the linear address space that is mapped to the host memory region, determining a bank, from among the plurality of banks that form the banked peripheral memory, that contains a memory location that is simulated by the referenced address of the memory access request, and mapping the determined bank to the host memory region.

31. The computer-readable medium of claim 30 wherein the step of mapping the determined bank to the host memory region comprises the step of:

mapping the memory location that is simulated by the referenced address of the memory access request to the approximate midpoint of the host memory region.

32. In a computer system having a host memory region that provides access to a limited region of a banked peripheral memory that is formed by a plurality of banks, a computer-readable medium holding computer-executable instructions for performing a method for providing access to the banked peripheral memory, the method comprising the steps of:

providing a first segment selector for a first segment and a second selector for a second segment wherein each segment simulates the banked peripheral memory as a contiguous linear buffer, wherein the first segment selector is used in servicing an input peripheral memory access request, and wherein the second segment selector is used in servicing an output peripheral memory access request, each respective peripheral memory access request referencing an address of the respective selector that the module desires to access;

providing a linear address space in which the provided segment selectors are positioned;

mapping a portion of the provided linear address space to the host memory region;

after receiving the input peripheral memory access request, determining whether the referenced address of the first segment selector is mapped to the portion of the linear address space that is mapped to the host memory region;

when the referenced address of the first segment selector is not mapped to the portion of the linear address space that is mapped to the host memory region, positioning the first segment selector so that the referenced address maps to the portion of the linear address space that is mapped to the host memory region, determining a bank, from among the plurality of banks that form the banked peripheral memory, that contains a memory location that is simulated by the referenced address of the input peripheral memory access request, and mapping the determined bank to the host memory region; and after receiving the output peripheral memory access request, determining whether the referenced address of the second segment selector is mapped to the portion of the linear address space that is mapped to the host memory region;

when the referenced address of the second segment selector is not mapped to the portion of the linear address space that is mapped to the host memory region, positioning the second segment selector so that the referenced address maps to the portion of the linear address space that is mapped to the host memory region, discerning a bank, from among the plurality of banks that form the banked peripheral memory, that contains a memory location that is simulated by the referenced address of the output peripheral memory access request, and mapping the discerned bank to the host memory region.

\* \* \* \* \*